United States Patent [19]
Tonn

[11] 3,979,838
[45] Sept. 14, 1976

[54] FAN MOTOR SAFETY FEATURE FOR GRAIN DRYING SYSTEM

[76] Inventor: Martin H. Tonn, Rte. No. 1, Amboy, Minn. 56010

[22] Filed: Sept. 29, 1975

[21] Appl. No.: 617,957

[52] U.S. Cl. ................................. 34/93; 55/311; 126/270
[51] Int. Cl.² ........................................ F26B 19/00
[58] Field of Search ........... 34/93, 219, 82; 55/309, 55/310, 311; 126/270, 271

[56] References Cited
UNITED STATES PATENTS

| | | | |
|---|---|---|---|
| 1,195,983 | 8/1916 | Farmer | 55/311 |
| 1,853,496 | 4/1932 | Blair | 55/311 |
| 1,994,766 | 3/1935 | Heglar | 55/311 |
| 3,908,631 | 9/1975 | Rom | 34/93 |
| 3,919,784 | 11/1975 | Tonn | 34/93 |

Primary Examiner—Kenneth W. Sprague
Assistant Examiner—James C. Yeung
Attorney, Agent, or Firm—Orrin M. Haugen

[57] ABSTRACT

A crop-drying system utilizing a conventional crop or grain confining bin having means for delivering drying air to the grain retained within the bin. A solar pre-heat chamber is utilized to deliver pre-heated air to the impeller, with the solar pre-heat chamber comprising an elongated tubular structure having bottom, side and top walls, and wherein the bottom wall is an opaque, highly absorbent flexible film, with the side and top walls being transparent, highly transmissive flexible films. The pre-heat chamber is coupled to an air inlet chamber, with normally closed vents being provided for responding to a clogged condition to the normal inlet port of the inlet chamber.

5 Claims, 3 Drawing Figures

FAN MOTOR SAFETY FEATURE FOR GRAIN DRYING SYSTEM

CROSS-REFERENCE TO RELATED APPLICATION

The present invention is an improvement over that system disclosed and claimed in my co-pending application Ser. No. 427,146, filed Dec. 21, 1973, and entitled "SOLAR PRE-HEAT CHAMBER FOR GRAIN DRYERS".

BACKGROUND OF THE INVENTION

The present invention relates generally to a crop-drying system, and more specifically to a crop-drying system which employs a solar pre-heat chamber which delivers solar pre-heated air either directly to the crop-drying bin, or which may be mixed with air heated additionally by conventional burners. The system has been found to be valuable in conserving energy which would otherwise be necessary for heating the air, such as energy derived through the burning of conventional fuels such as liquified petroleum gas or the like. A conventional fan is normally employed to drive the air through the system, and means are provided to provide input air to the fan in the event the inlet port to the fan chamber becomes clogged with debris or film from the solar pre-heat chamber.

In drying of cash crops, such as corn, wheat, soybeans and the like, a grain-confining bin is employed having generally imperforate walls and top, with an air discharge vent being employed at the top of the bin. A perforated false bottom is employed in the bin so as to permit the admission and transfer of heated air through the false bottom, through the grain, and thence outwardly through the upper vent. An impeller is provided for forcing drying air through the system including the zone beneath the false bottom, the grain charge, and thence out through the vent.

In most conventional systems, a liquified petroleum gas burner is employed which heats the air being admitted to the drying bin. This heater preferably has a sensor activated burner, with the sensor detecting the relative humidity of the air being admitted to the grain-confining bin. For most drying purposes, air having a relative humidity of less than 50% must be employed, in order to achieve effective drying of the grain within the bin. For partially dried grain, the relative humidity requirements of the incoming air may, in certain instances, be less than 50%. It has been found that normal ambient air, when heated in a solar pre-heat chamber can be effectively elevated in temperature for temperature rises of up to 30° F. and more, and thus for most normal autumn days, when drying is being undertaken, the solar pre-heat chamber may be utilized effectively without requiring supplemental heat from the liquified petroluem gas burner. Obviously, these conditions apply only during the sunlight hours, and nighttime hours may require more frequent use and cycling of the liquified petroleum gas burner.

SUMMARY OF THE INVENTION

The solar pre-heat chamber and protective air inlet system of the present invention is designed to be coupled to deliver air to the impeller, and thence ultimately through the system under the influence of the working impeller. Preferably, the solar pre-heat chamber is an elongated structure having a bottom wall, side and top walls, with the walls being wrapped about a frame means which define the periphery of the chamber. The bottom wall is preferably disposed immediately upon the ground, and is in the form of a solar absorbing flexible film, such as black polyethylene film, with the side and top walls being clear transparent films highly transmissive to solar radiation. The rays from the sun which penetrate the top and side walls impinge upon the bottom wall where they are absorbed, and by conductive thermal and radiant transfer, the air moving through the chamber becomes heated.

Therefore, it is a primary object of the present invention to provide a solar pre-heat chamber which is effective in elevating the temperature of atmospheric air being utilized in a grain-drying system, and wherein means are provided for protecting the impeller utilized to drive air through the system.

It is yet a further object of the present invention to provide an improved solar pre-heat chamber to be used with grain-drying systems wherein the motor for the impeller is protected against damage due to clogging of the normal inlet to the system.

It is yet a further object of the present invention to provide an improved solar pre-heat chamber and protective air inlet system for use in combination with a crop-drying bin, wherein solar pre-heated air is fed into the bin for extracting moisture from the grain to increase the drying rate thereof.

Other and further objects of the present invention will become apparent to those skilled in the art upon a study of the following specification, appended claims, and accompanying drawing.

DESCRIPTION OF THE PREFERRED EMBODIMENT

Figure 1:
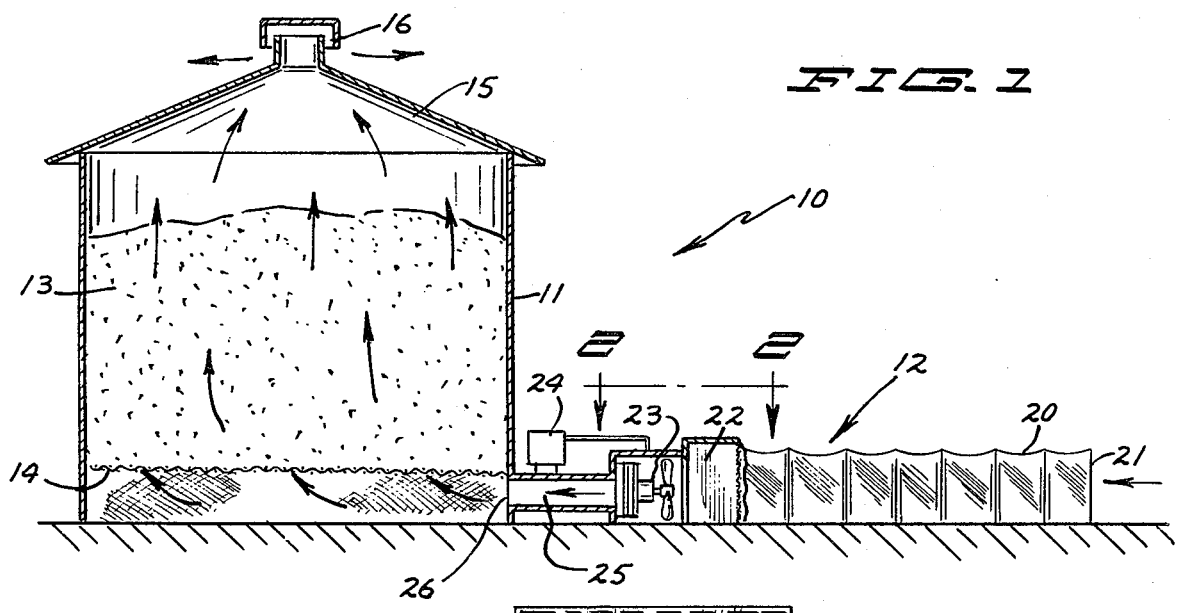
FIG. 1 is a schematic illustration, partially broken away, and illustrating a conventional grain-drying system utilizing the solar pre-heating chamber and protective air inlet system of the present invention.

In accordance with the preferred embodiment of the present invention, the grain-drying system generally designated 10 includes a grain-confining bin having generally cylindrical sides walls 11 for confining a load of grain therein, with the grain being shown at 13. The grain is supported on a perforate base member 14, which provides a zone for delivering drying air to the grain supporting base 14. The grain occupies, of course, most of the volume of the bin, and the upper zone is utilized to move the drying air outwardly of the bin through vent 16 formed in cover member or roof 15. In this connection, the bin, as defined, is conventional and is among any of a variety which are commercially available.

The air which is passed through the system is transmitted through the solar pre-heat chamber generally designated 12 which includes a cover member 20 comprising the side and top walls of the chamber, as shown at 21, with the chamber being in communication with the air inlet chamber 22 to the bin. Air inlet chamber 22 houses an impeller, as indicated, with a heater member being shown at 23 for introducing thermal energy to the air admitted to the system. Again, this portion of the system is conventional and known in the art, and also available commercially. The throat of the inlet 25 receives heated air for transmission through inlet conduit 25, and thence through base port 26, and thereafter through the grain retained in the bin 11.

Turning now to the details of the solar pre-heat chamber 12, attention is directed to my co-pending application Ser. No. 427,146, wherein the details of this system are fully described. However, for descriptive purposes, attention is directed to FIGS. 1 and 3 wherein these details are also illustrated. As indicated, the top and side walls of the chamber are formed by flexible film member 21, which is preferably 1 mil polyethylene, transparent and clear. The base member for the chamber, not shown, is an opaque flexible film, such as opaque black polyethylene film, this film being dyed with carbon black pigments. Base film is laid upon the surface of the ground, and is held in place by horizontal bar rails of the individual inverted "U" shaped frame means described in detail in my co-pending application Ser. No. 427,146.

Frame means include the bottom rails along with generally inverted "U" shaped frame members which define the side and top walls of the chamber. In order to provide support within the ground, leg extensions are provided for setting the inverted "U" shaped frame in place. A plurality of these spaced frames are then placed in position, and a plurality of horizontal support rails are provided, such as in the form of lines ropes so as to provide an elongated solar pre-heat tunnel. As many of these horizontal support rails are provided as are reasonably indicated to simply retain the transparent film 21 in generally confining disposition about the circumference of the generally "U" shaped support members. The lateral ends of the film members are also held in place, such as by a weighted member such as a length of pipe, thus keeping the chamber air-tight and free from collapse due to rain, snow, wind, or the like.

It will be appreciated that the present system improves the economics of the grain-drying operations by providing solar pre-heated energy to be transmitted to the grain-confining bin. As has been indicated, a 30° F. rise may be achieved with sunlight available on a clear day at 45° North latitude, during the month of September, and up until and through the early days of October. Obviously, individual intensity of sunlight, availability of sunlight due to cloudy conditions, and the like must be taken into account, however these conditions will merely determine the quantity of liquified petroleum gas or other form of fuel which may otherwise be required for the grain-drying operation. Also, it will be appreciated that the system may be functional on days when the relative humidity may be reasonably high, with the solar energy being utilized to increase the temperature of the incoming air and thus achieve a substantial drop in the relative humidity. In other words, grain may be effectively dried through the influence of solar energy or solar energy boost even when the outdoor conditions provide atmospheric air at 60° F. and 80% relative humidity.

In order to effectively cycle the liquified petroleum gas burner, a relative humidity sensor will be interposed in the throat area 25 of the system, and when the relative humidity of the solar pre-heated air is in excess of about 50%, the burner will be cycled on in order to raise the temperature sufficiently so as to drop the relative humidity to a level below 50%. Again, this arrangement is conventional in many grain-drying systems, with the burner being energized or cycled each time the atmospheric air conditions provide air at a relative humidity of greater than 50%.

Figure 2:
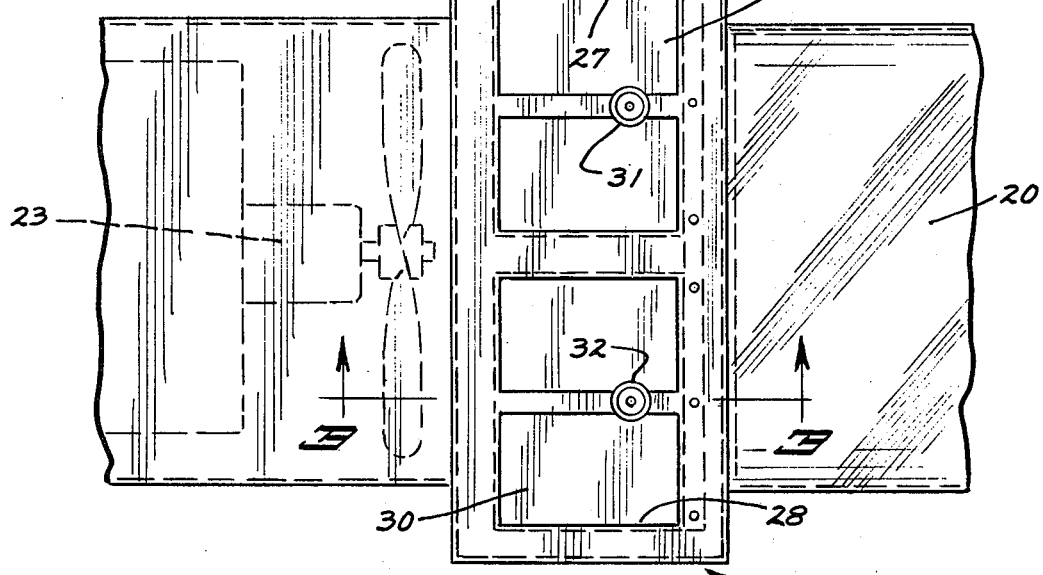
FIG. 2 is a vertical sectional view on a slightly enlarged scale taken along the line and in the direction of the arrows 2—2 of FIG. 1.
Figure 3:
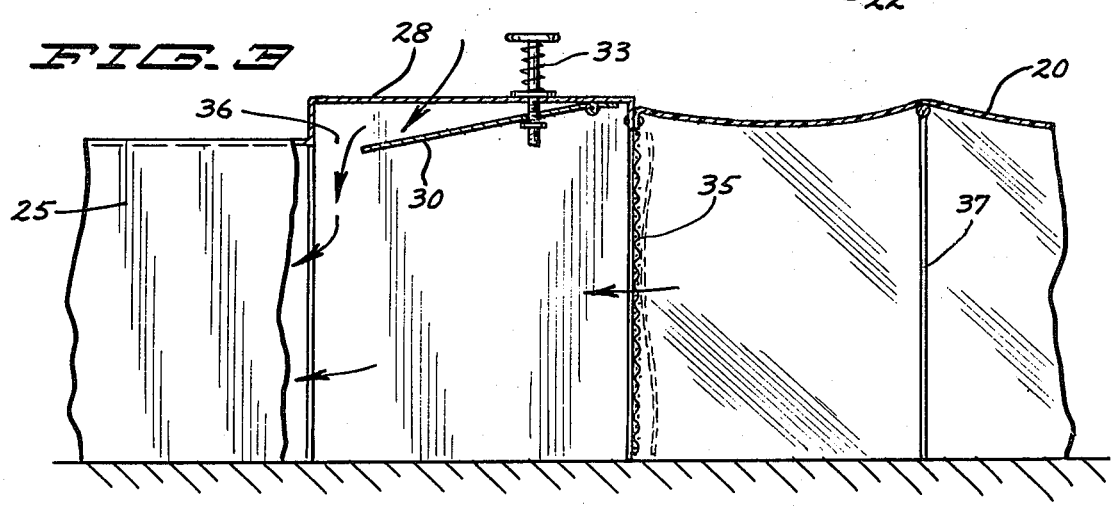
FIG. 3 is a side elevational view, partially broken away, and illustrating the air inlet chamber portion of the solar pre-heating chamber of the present invention generally along the line and in the direction of the arrows 3—3 of FIG. 2.

Attention is now directed to FIGS. 2 and 3 wherein details of the protective air inlet system are illustrated. As is apparent, impeller 23 is being utilized to propel air through the system, with the motor portion of the impeller being cooled by the flow of air passing thereover. In the event of a collapse or partial collapse of the solar pre-heat chamber 20, film would be expected to cover the inlet to the chamber 22, and thus choke off the flow of air to the system as well as to the motor of fan 23. Accordingly, the upper surface of chamber 22 is provided with a pair of vent openings, illustrated in phantom as at 27 and 28, with each such opening having a pair of ports, as illustrated in FIG. 2. A pair of normally closed flaps are provided as at 29 and 30, with these flaps being retained in closed disposition by means of spring assemblies 31 and 32. In FIG. 3, resilient spring member 33 is illustrated for a showing of a partially opened flap, which has been opened in response to a clogged condition existing in screen opening 35. An inlet pressure drop in chamber 22 of the order of a few inches of water will normally be sufficient to commence opening of flaps 29 and 30, with these flaps opening in response to a clogged or partially starved inlet. In FIG. 3, arrows 36-36 illustrate the flow of air passing through the opening formed in the vent system. Also, in this view, a typical section of a support member is in the solar pre-heat chamber is illustrated at 37.

The entire area available for air flow through the individual flaps 29 and 30 should be equal to at least about one-third of the total area of the opening as at 35. This will, in most instances, provide sufficient protection for the fan motor of fan or impeller 23.

For materials of construction, the bin walls 11 are preferably fabricated from corrugated sheet metal, such as galvanized iron or the like. Again, these chambers are commercially available and provide the generally imperforate walls and top. Normally, the side walls are cylindrical and thus define a cylindrical chamber.

It will be appreciated that the elongated chamber 12 may have any convenient length-to-width ratio. It has been found, however, that a length-to-width ratio of greater than about 10 is desired for effective operation, with a convenient dimension being a chamber having a length of about 100 ft. and a width of about 8 ft. Such a ratio of length to width provides sufficient thermal gain for air under those conditions normally encountered at 45° North latitude in the autumn months.

The crop drying system of the present invention is capable of application to batch-drying apparatus as well. In such a system, batch-drying occurs at a location remote from the ultimate storage bin, and individual batches of dried grain are transferred from the drying station to the storage bin. It will be appreciated, therefore, that the solar energy extracting means for heating and drying air prior to passage through the drying bin is usable in connection with batch systems as well as bin-drying systems.

I claim:

1. In a crop-drying system including a grain-confining bin having generally imperforate top and side walls, venting means at the top of said bin, and grain-supporting perforate base means adjacent the base of said bin, said imperforate side and top walls and said grain-supporting perforate base defining a grain-drying chamber, an air inlet chamber having an inlet port, impeller means within said inlet chamber for delivering drying air to a zone beneath said grain-supporting perforate base for passage through said drying chamber, drive means for said impeller means disposed in said drying air path, said system including solar energy extracting means for heating said drying air prior to passage through said drying bin, said solar energy extracting means comprising:

a. an elongated solar heating chamber having one end in direct communication with said air inlet chamber, and with the opposed remote end in communication with atmosphere, and comprising frame means with generally water-impermeable bottom, side and top walls, said walls being wrapped about said frame means and defining said solar heating chamber; and b. said air inlet chamber having normally closed vent means therein for admission of air from ambience to said inlet chamber upon a clogging condition occurring at said inlet port.

2. The crop-drying system as defined in claim 1 being particularly characterized in that said side, top and bottom walls are polyethylene film.

3. The crop-drying system as defined in claim 1 being particularly characterized in that said inlet chamber vent means is a port with an area at least one-third that of said inlet port.

4. The crop-drying system as defined in claim 1 being particularly characterized in that auxiliary heating means are provided for delivering thermal energy to drying air delivered from said solar energy extraction means.

5. The crop-drying system as defined in claim 1 being particularly characterized in that said inlet port is provided with a debris impervious grid.

* * * * *